April 20, 1926.
E. E. BRASS
1,581,780
SHAKER FOR CANNED PRODUCTS
Filed March 13, 1925
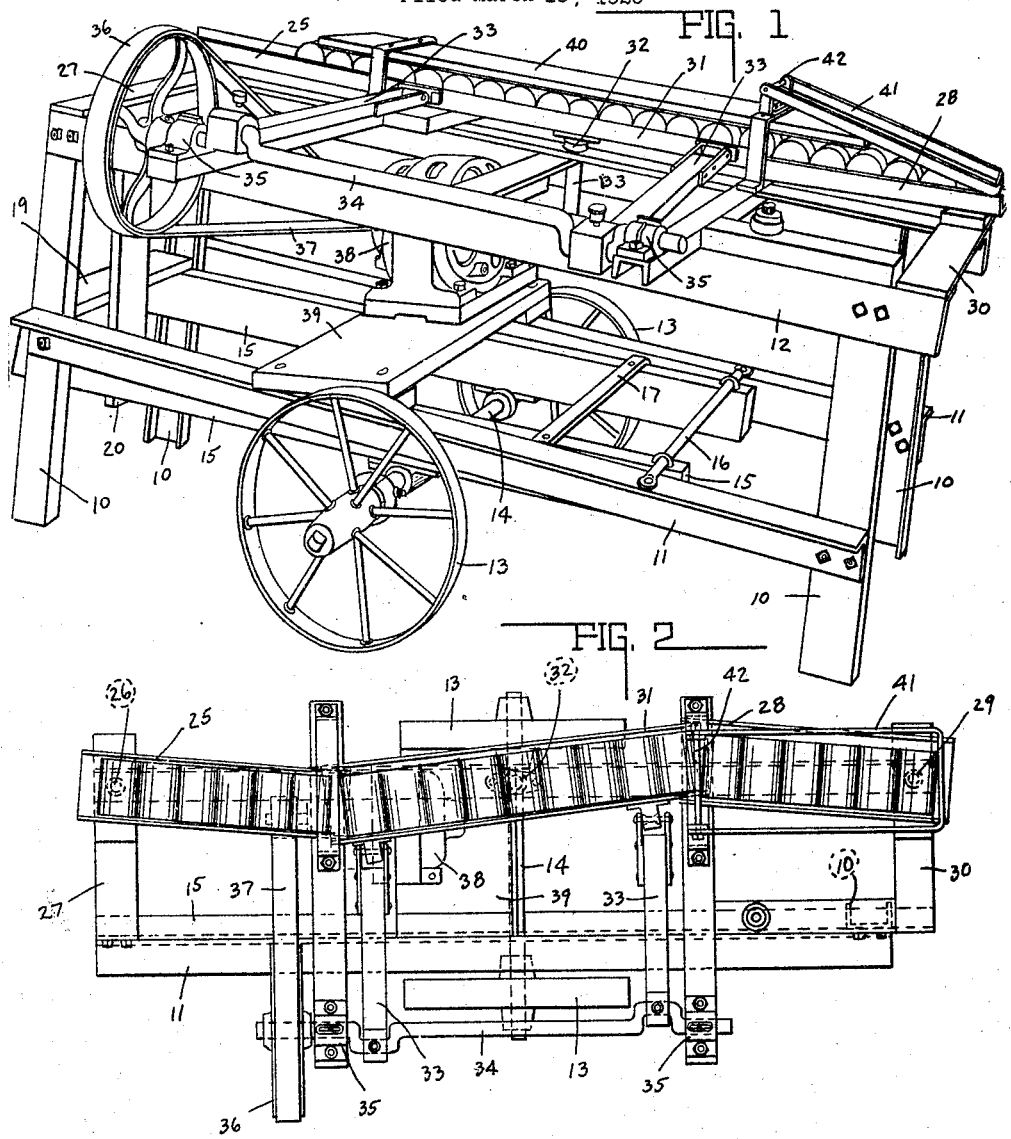
INVENTOR.
EDWARD E. BRASS.
BY
ATTORNEYS.

Patented Apr. 20, 1926.

1,581,780

UNITED STATES PATENT OFFICE.

EDWARD E. BRASS, OF PETERSBURG, ILLINOIS.

SHAKER FOR CANNED PRODUCTS.

Application filed March 13, 1925. Serial No. 15,299.

*To all whom it may concern:*

Be it known that I, EDWARD E. BRASS, a citizen of the United States, and a resident of Petersburg, county of Menard, and State of Illinois, have invented a certain new and useful Shaker for Canned Products; and I do hereby declare that the following is a full, clear, and exact description thereof, reference being had to the accompanying drawings, in which like numerals refer to like parts.

This invention pertains to a shaking device for canned goods, wherein it is desired to cause the juice or liquid portion thereof to be thoroughly diffused throughout the contents of the can so as to maintain the solids in suspension through an indefinite period.

This invention contemplates a machine which mechanically shakes the canned goods after the canning thereof and before the shipment or storage of the canned goods. Such mechanical shaking causes a thorough mixture of the solids and liquid, such as will cause the solids to remain in suspension thereafter for an indefinite period. This is accomplished by a portable and mechanically operated shaker which receives cans from a suitable runway or conveyor, shakes them and discharges them for labeling or packing.

The full nature of the invention will be understod from the accompanying drawings and the following description and claims:

In the drawings, Figure 1 is a perspective view of the shaking device. Fig. 2 is a top plan view thereof.

In the drawings there is shown a shaking device comprising a frame having legs 10, lower side bars 11 and upper side bars 12. The rear legs are longer than the front legs so that the top of the frame slopes gradually downwardly from the rear to the front. The frame is provided with a pair of wheels 13 mounted on an axle 14 for facilitating the transportation thereof about the plant in order that it may be readily moved from one pile of canned goods to another. Mounted on the axle 14 there is a pair of beams 15 extending longitudinally of the frame and adjacent the inner sides of the lower side bars 11. The forward ends of the beams 15 are pivotally mounted beneath a cross rod 16 rigidly extending between the forward portion of the lower side bars 11 and rigidly secured thereon. The beams 15 have a tie bar 17 adjacent their forward ends, and a platform 19 mounted on the rear ends thereof and tying them together. By means of this arrangement, when the machine is in use, the rear portion of the beams 15 and platform 19 are disconnected from the frame so that the frame rests upon four legs 10. When it is desired to move the machine about the plant, the rear portion of the frame is elevated until the lower end of a prop 20, which is hinged to the upper end of the frame, may rest upon the platform 19. This elevates the rear legs from the floor, and by reason of the connection of the beams 15 with the cross rod 16 and their fulcrum mounting upon the axle 14, the front legs will also be elevated. In this position the machine may rest entirely upon the wheels 13 with the legs off the ground.

Mounted on one side of the machine and extending longitudinally thereof, there is a feeding trough 25 which is pivoted at 26 to a cross member 27 of the frame, whereby the free end of the feeding trough may swing back and forth about the pivot 26. On the opposite end of the machine there is a similar discharge trough 28 which is likewise pivoted at 29 to a cross bar 30. Said troughs extend inwardly of the machine and longitudinally thereof substantially one-fourth of the way and are connected by an intervening reciprocating trough or shaker 31. The shaker 31 is pivotally mounted on one of the upper side bars 12 at 32 by means of a suitable spindle 133 extending downwardly into a bearing cup. The free end of the feeding trough 25 extends loosely within the shaker 31 and the discharge end of the shaker extends freely within the free end of the discharge trough 28 so as to have a loose fit therewith sufficient to allow the reciprocating movement.

Pivoted at each end of the shaking trough 31 there are crank arms 33 which extend across the top of the frame and are connected with the crank portions of the crank shaft 34, the crank shaft being supported by the main bearings 35 and driven by a pulley 36. The pulley 36 is driven through a belt 37 by a motor 38 which is mounted within the frame of the machine on a support 39 mounted on the two lower side bars 11.

The crank portions of the crank shaft being opposed, it is obvious that upon the rotation thereof, the shaker trough 31 will be agitated or reciprocated about the central pivotal mounting 32. The action of this trough will cause a similar action of the feeding and discharging troughs, causing their free ends to reciprocate about the pivotal mountings 26 and 29, respectively. As the canned goods are rolled onto the feeding trough 25, by gravity, they will be shaken thereon endwise and will continue to roll into the shaker trough 31, which will continue to shake and agitate them after which they will roll onto the discharge trough 28 which also will shake and agitate them until they are discharged from the machine. Therefore, during their passage therethrough they will be violently shaken endwise so as to cause the contents to be thoroughly mixed and the solids will be held in suspension by the liquid.

By reason of the inclined position of the frame of the machine, the cans will roll downwardly through the respective troughs but not sufficiently fast to overcome the vibrating action. They will accordingly be held in position until pushed onto the shaker feeding trough. In order that the cans may not be thrown from the troughs, there is a guard plank 40 which is mounted over the respective troughs, which guard member may be stationary and need not be directly connected therewith. A stop member 41 in the form of a U-shaped bar is provided adjacent the discharge end of the trough 28 which may be dropped down into the position shown in Fig. 1 to prevent the cans from rolling therefrom if desired, the free ends of said stop member being pivotally mounted on the frame at 42.

The cranks which operate the shaking trough are opposed in action. Therefore, when the shaker is in operation, the load is balanced, thus eliminating weights or other counter-balancing devices, and since the load is balanced, the machine is free from vibration. It will further be noted that the cans roll over continuously as they pass through the shaking trough, thereby shaking the cans in a series of positions and eliminating the necessity of employing a mechanical feed to force their travel through the machine. The speed of the cans through the trough is governed somewhat by gravity, the effect of which can be altered by decreasing or increasing the slope of the trough. The effect of centrifugal motion is taken advantage of, as, for instance, an individual can will not roll through the shaker trough of its own accord, but must be pushed forward by the can following. This is because the oscillating trough imparts a centrifugal motion to the can which equals the effect of gravity. Thus the speed at which the cans pass through the shaking trough may be governed by the slope of the feeding trough or any external means.

The invention claimed is:

1. A shaking machine for canned goods, comprising a frame, a shaking member for receiving canned goods movably mounted on said frame, power driven means connected with said member for causing the same to be agitated and reciprocated thereon, a trough pivoted at one end and having its free end connected with said shaking member for feeding the canned goods thereto, and a discharge trough pivoted at one end to said frame and having its free end connected with the discharge end of said shaking member for receiving the canned goods therefrom.

2. A shaking machine for canned goods comprising a frame, a trough-like shaking member movably mounted on said frame, power driven means connected to said member for agitating the same and causing the reciprocating movement thereof, and a feeding trough pivoted at one end and having its free end connected with one end of said shaking member for feeding the canned goods thereto during the reciprocating movement.

3. A shaking machine for canned goods, comprising a shaking member for receiving the cans and permitting their relatively slow passage therethrough, means for feeding the cans in said member, power driven means connected therewith for agitating and causing the reciprocable movement thereof for shaking said cans, and a guard member mounted thereover for preventing said cans from being thrown therefrom.

4. A shaking machine for canned goods comprising a frame, a trough-like shaking member movably mounted on said frame, a power driven crank shaft mounted on said frame, crank arms connecting the crank portions of said shaft with said member for causing the agitation or reciprocable movement thereof upon said mounting, a feeding trough pivoted at one end and communicating with said member for feeding canned goods thereto while in action, and a discharge trough pivoted at the other end of said machine and having its free end connected with said member for receiving the cans discharged therefrom while in action.

In witness whereof, I have hereunto affixed my signature.

EDWARD E. BRASS.